United States Patent
Koonce et al.

(10) Patent No.: US 7,725,535 B2
(45) Date of Patent: May 25, 2010

(54) CLIENT-SIDE STORAGE AND DISTRIBUTION OF ASYNCHRONOUS INCLUDES IN AN APPLICATION SERVER ENVIRONMENT

(75) Inventors: Erinn Elizabeth Koonce, Durham, NC (US); Maxim Avery Moldenhauer, Durham, NC (US); Rohit Dilip Kelapure, Morrisville, NC (US); Todd Eric Kaplinger, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 12/127,420

(22) Filed: May 27, 2008

(65) Prior Publication Data

US 2009/0300096 A1 Dec. 3, 2009

(51) Int. Cl.
*G06F 15/16* (2006.01)
(52) U.S. Cl. ............... 709/203; 709/219; 709/248
(58) Field of Classification Search .......... 709/203, 709/219, 248
See application file for complete search history.

(56) References Cited

U.S. PATENT DOCUMENTS

| | | | | |
|---|---|---|---|---|
| 5,787,470 A | * | 7/1998 | DeSimone et al. | 711/124 |
| 6,138,141 A | * | 10/2000 | DeSimone et al. | 709/203 |
| 7,349,902 B1 | * | 3/2008 | Arlitt et al. | 707/8 |
| 2008/0016151 A1 | * | 1/2008 | Howard et al. | 709/203 |
| 2008/0301300 A1 | * | 12/2008 | Toub | 709/227 |
| 2009/0119361 A1 | * | 5/2009 | Burckart et al. | 709/203 |
| 2009/0307304 A1 | * | 12/2009 | Moldenhauer et al. | 709/203 |

* cited by examiner

*Primary Examiner*—Krisna Lim
(74) *Attorney, Agent, or Firm*—Jeanine S. Ray-Yarletts; Yee & Associates, P.C.

(57) ABSTRACT

A process for facilitating distribution of asynchronous content by a result server includes subscribing at least one client in response to subscription requests for the asynchronous content received at the result server from the at least one client. The process further includes publishing the asynchronous content. The publishing leads to dissemination of the asynchronous content from the result server to the subscribed clients, and removal of the asynchronous content from the result server. The process further includes receiving a subscription request from additional client(s). The process further includes polling the subscribed clients for the asynchronous content and sending the asynchronous content to the additional client(s) upon receipt of the asynchronous content from any client belonging to the subscribed clients.

12 Claims, 4 Drawing Sheets

CLIENT-SIDE STORAGE AND DISTRIBUTION OF ASYNCHRONOUS INCLUDES IN AN APPLICATION SERVER ENVIRONMENT

FIELD OF THE INVENTION

The present invention generally relates to an application server environment and more specifically the present invention relates to facilitating the caching and distribution of content between multiple clients in the application server environment.

BACKGROUND OF THE INVENTION

In an application server environment, a server is generally connected to multiple clients via a communication network. The clients are used at an end user system for interacting with the server. The client may be, for example an interface such as a web browser, a Java-based program, or any other Web-enabled programming application. Usually, the clients request the server for certain information. The server executes some applications that can generate the content corresponding to the client's request.

Generally, for synchronous actions the server sends response content in the order of the synchronous actions. For asynchronous actions, the server aggregates the content and sends a response corresponding to the client's request. Some earlier asynchronous solutions defined the concept of offloading the responsibility of aggregating the generated content to the client that made the initial request. Currently when the result server maintains include results and distributes them as needed, caching of the content on the server for an indeterminate time period is required so that the server is able to serve other clients requesting for the same content. Moreover, depending on the particular implementation, the client would need to either constantly poll the application server or keep a connection open until the application server finishes processing the request.

This aggregation process may be costly in terms of memory and request processing resources at the server. Moreover, caching requirements on the server burdens available cache space at the server. Furthermore, as the variability of the web content increases, the probability that the majority of the cached web content on the server may be requested again decreases, thereby rendering known caching techniques less effective.

Another existing solution provided a peer-to-peer client web caching system, where end users collectively share their web cache contents, thereby reducing burden on web servers. However, this requires the configuration of a proxy location in the client to handle the proxy requests, or additional software to be installed on the client to handle the normal requests, or both.

In accordance with the foregoing, there is a need for a solution, where the server can offload the responsibility of caching the content to clients and share the content between multiple clients.

BRIEF SUMMARY OF THE INVENTION

A computer implemented process for facilitating distribution of asynchronous content by a result server is provided. The process includes subscribing at least one client in response to subscription requests for the asynchronous content received at the result server from the at least one client. The process further includes publishing the asynchronous content. The publishing leads to dissemination of the asynchronous content from the result server to the subscribed clients, and removal of the asynchronous content from the result server. The process further includes receiving a subscription request from additional client(s). The process further includes polling the subscribed clients for the asynchronous content and sending the asynchronous content to the additional client(s) upon receipt of the asynchronous content from any of the subscribed clients.

A programmable apparatus for facilitating distribution of asynchronous content by a result server is provided. The apparatus includes programmable hardware connected to a memory. The apparatus further includes a program stored in the memory and the program directs the programmable hardware to perform the step of subscribing at least one client in response to subscription requests for the asynchronous content received at the result server from the at least one client. The program further directs the programmable hardware to perform the step of publishing the asynchronous content. The publishing leads to dissemination of the asynchronous content from the result server to the at least client, and removal of the asynchronous content from the result server. The program further directs the programmable hardware to perform the step of receiving a subscription request from additional client(s), The program directs the programmable hardware to also perform polling the subscribed clients for the asynchronous content and sending the asynchronous content to the additional client(s) upon receipt of the asynchronous content from any of the subscribed clients.

A computer program product for causing a computer to facilitate distribution of asynchronous content by a result server is provided. The computer program product includes a computer readable storage medium. The computer program product further includes a program stored in the computer readable storage medium. The computer readable storage medium, so configured by the program, causes a computer to perform the step of subscribing at least one client in response to subscription requests for the asynchronous content received at the result server from the at least one client. The computer is further configured to perform the step of publishing the asynchronous content. The publishing leads to dissemination of the asynchronous content from the result server to the subscribed clients, and removal of the asynchronous content from the result server. The computer is further configured to perform the step of receiving a subscription request from additional client(s). The computer is further configured to perform the step of polling the subscribed clients for the asynchronous content and sending the asynchronous content to the additional client(s) upon receipt of the asynchronous content from any of the subscribed clients.

DETAILED DESCRIPTION

The present invention would now be explained with reference to the accompanying figures. Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Figure 1:
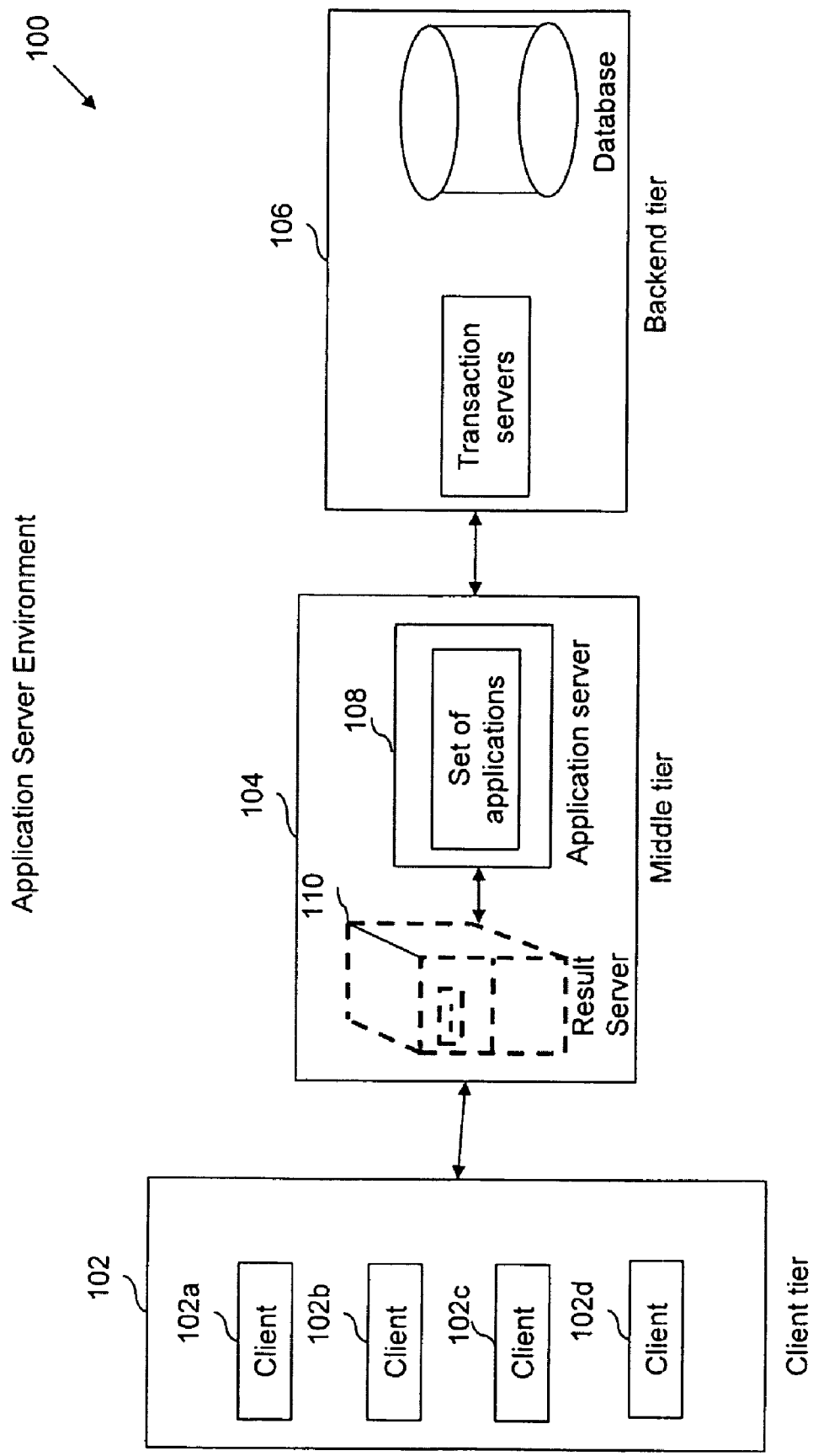
FIG. 1 illustrates an application server environment in accordance with an embodiment of the present invention.

FIG. 1 illustrates application server environment 100 in accordance with an embodiment of the present invention. Application server environment 100 is shown as a three-tier architecture including client tier 102, server tier 104, and backend tier 106. Client tier 102 represents an interface at end user systems that interacts with server tier 104. Usually, the interface is, but not limited to, a web browser, a Java-based program, or any other Web-enabled programming application. There may be multiple end users and each end user may have a client, thus client tier 102 shown in the FIG. 1 represents one or more clients 102a-d, which interacts with server tier 104 for processing of their requests. Server tier 104 includes application server 108 and web server (hereinafter referred as result server) 110. In an embodiment of the present invention, application server 108 may host result server 110, which is communicatively coupled with a set of applications in application server 108 to support the requests from client tier 102. Result server 110 can be a part of application server 108 or can be a separate entity in communication with application server 108. Result server 110 provides an interface between one or more clients 102a-d and application server 108. It will be apparent to a person skilled in the art that any application server and client may be used within the context of the present invention, without limiting the scope of the present invention. Application server 108 may set up a connection with backend tier 106 for extracting information corresponding to the request by client tier 102. Backend tier 106 includes databases and transaction server for providing content of the processing requests.

In an embodiment of the present invention, result server 110 can emulate a Publication/Subscription model (i.e., Pub/Sub model) where result server 110 can subscribe one or more client 102a-d in response to the subscription request from one or more clients 102a-d and subsequently publish the content corresponding to the subscription request. In an embodiment of the present invention the subscription request is for asynchronous include content. Asynchronous include content (hereinafter interchangeably referred to as asynchronous content) is the result of a servlet or Java Server Page (JSP) include call that is executed on a separate thread within application server 108. Once the include job has completed, the result, or asynchronous include content, is published to the result server 110. The processing of the request for the asynchronous content occurs within application server 108, and only when the processing is complete, the asynchronous content is provided to the result server 110.

Figure 2:
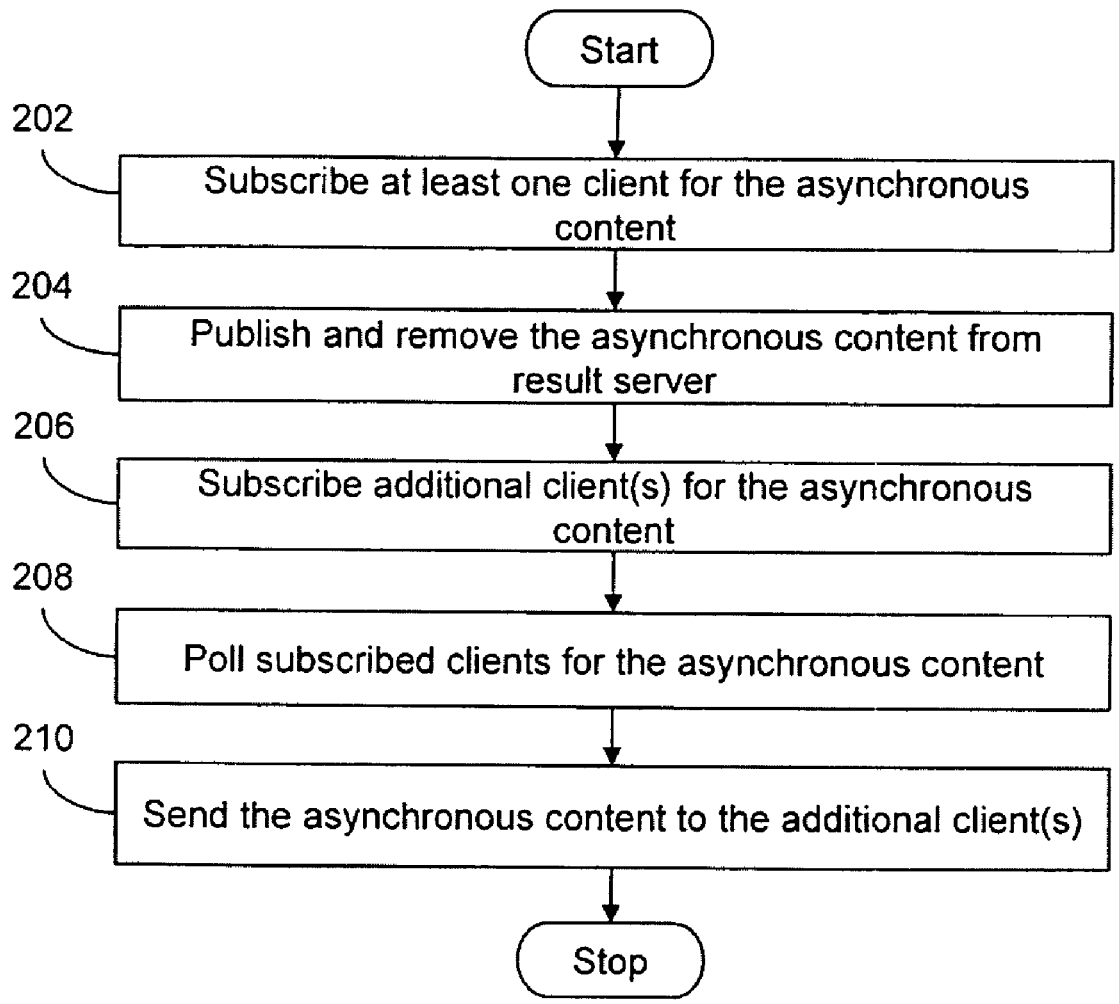
FIG. 2 is a flowchart depicting a process for facilitating distribution of asynchronous content between one or more clients in accordance with one embodiment of the present invention.

FIG. 2 is a flowchart depicting a process for facilitating distribution of asynchronous content by result server 110 between one or more clients 102a-d in accordance with an embodiment of the present invention. At step (202), result server 110 subscribes at least one client (say client 102a) from the one or more clients 102a-d in response to the subscription requests received at result server 110 for the asynchronous content. In an embodiment of the present invention, result server 110 subscribes two clients 102a and 102b. Hence, both clients 102a and 102b are hereinafter referred as subscribed clients. Subsequently, at step (204), result server 110 publishes the asynchronous content. The asynchronous content is published when the asynchronous content is available to result server 110 from application server 108. In an embodiment of the present invention, the publishing of the asynchronous content by result server 110 may lead to dissemination of the asynchronous content to subscribed clients 102a and 102b, and subsequent removal of the asynchronous content from result server 110.

In an embodiment of the present invention, subscribed clients 102a and 102b may cache the asynchronous content and store the asynchronous content either at the client storage space or at the end users' system which hosts the client. However, for caching and storing the asynchronous content, subscribed clients 102a and 102b may require some technology add-on for caching and storing the asynchronous content at the clients or at end users' systems hosting the clients. Thus, any application program interface (API) can be used that provides JavaScript applications with storage. For example, Dojo.Storage can be used at subscribed clients 102a and 102b for caching and storing the asynchronous content. Dojo.Storage is a unified application program interface (API) to provide JavaScript applications with storage. Dojo.Storage is a generic front-end to be able to provide all JavaScript applications a consistent API for their storage needs, whether this JavaScript is in a browser, a Firefox™ plug-in, or in an ActiveX™ control using Windows™ Scripting Host, etc. Further, Dojo.Storage automatically detects its environment and available storage options and selects the most appropriate one. The available storage option for caching the asynchronous content may lie inside the client-cache or at other storage options within the end user's system hosting the client.

FIG. 2 further depicts step (206) where result server 110 receives the subscription request from additional client(s) (say client 102c and 102d) for the asynchronous content. It is apparent to a person skilled in the art that these clients are taken only for exemplary purposes and do not intend to limit the scope of the invention. Any number of client(s) from these four clients (102a-b) may be the subscribed clients and the additional clients. Subsequently, if result server 110 has removed the asynchronous content after disseminating the asynchronous content, then at step (208) result server 110 polls subscribed clients 102a and 102b for the asynchronous content. Upon receiving the poll from result server 110, any of the subscribed clients 102a and 102b may respond to result server 110 for the availability of the asynchronous content. In an embodiment of the present invention, only clients who are still subscribed with result server 110, respond to the poll from the result server 110. In an embodiment of the present invention, result server 110 has a pre-defined condition for selecting a client from subscribed clients 102a and 102b that responds to the poll, for receiving the asynchronous content. For example one pre-defined condition can be selecting first client from subscribed clients 102a and 102b that responds to the poll from result server 110. Consequently, at step (210) result server 110 sends the asynchronous content (as received from subscribed clients at step (208)) to the additional client(s) 102c and 102d. Thus, result server 110 distributes the asynchronous content between subscribed clients 102a and 102b and additional clients 102c and 102d. In an embodiment of the present invention, when result server 110 sends the asynchronous content to additional client(s) 102c and 102d then for any future asynchronous content request from any other client, result server 110 may also poll additional client(s) 102c and 102d in addition to polling subscribed clients 102a and 102b, provided all these clients are still subscribed with result server 110.

In an embodiment of the present invention, if the requests for asynchronous content exceeds a predetermined threshold, then result server 110 caches the asynchronous content instead of proxying/transferring the asynchronous content from one client to another client.

Figure 3:
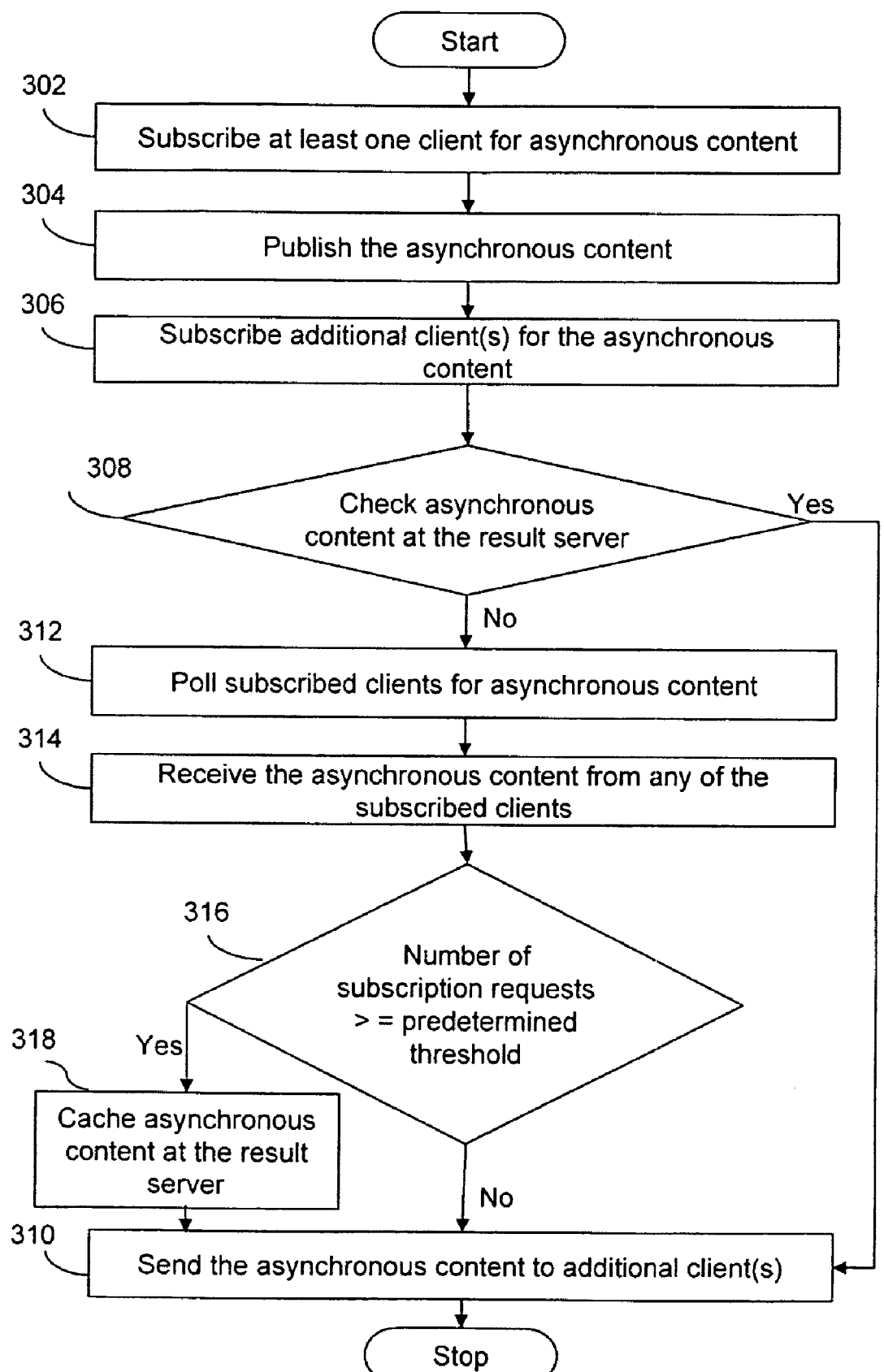
FIG. 3 is a flowchart depicting a process for facilitating distribution of content between one or more clients in accordance with another embodiment of the present invention.

FIG. 3 is a flowchart depicting a process for facilitating distribution of asynchronous content by result server 110 between one or more clients 102a-d in accordance with another embodiment of the present invention. Steps (302), (304), and (306) are similar to steps (202), (204) and (206) respectively, as explained in conjunction with the FIG. 2. Once result server 110 receives the subscription request from additional client(s) 102c and 102d at step (306) for the asynchronous content, then at step (308), result server 110 checks if the asynchronous content is already cached on result server 110. In an embodiment of the present invention, if the asynchronous content is cached on result server 110, then at step (310) result server 110 directly sends the asynchronous content to additional client(s) 102c and 102d. In another embodiment of the present invention, if the asynchronous content is not cached on result server 110, then at step (312), result server 110 polls subscribed clients 102a and 102b for the asynchronous content. Subsequently, at step (314), result server 110 receives the asynchronous content from any of subscribed clients 102a and 102b. Thereafter, at step (316), result server 110 compares number of subscription requests received for the asynchronous content with a pre-determined threshold. In an embodiment of the present invention, the pre-determined threshold is set by result server 110 based on some predefined conditions, which may depend on the nature of the asynchronous content. In an embodiment of the present invention, if number of subscription requests equals or exceeds the pre-determined threshold then, at step (318), result server 110 caches the asynchronous content in a server-cache. By doing so, in case result server 110 receives subscription request from any further client(s), other than the previously subscribed clients, for the asynchronous content, then result server 110 sends the asynchronous content directly from the server-cache. In another embodiment of the present invention, if number of requests is less than the pre-determined threshold then, result server 110 does not cache the asynchronous content in the server-cache, and sends the asynchronous content to additional client(s) 102c and 102d as-is received from any of subscribed clients 102a and 102b.

Figure 4:
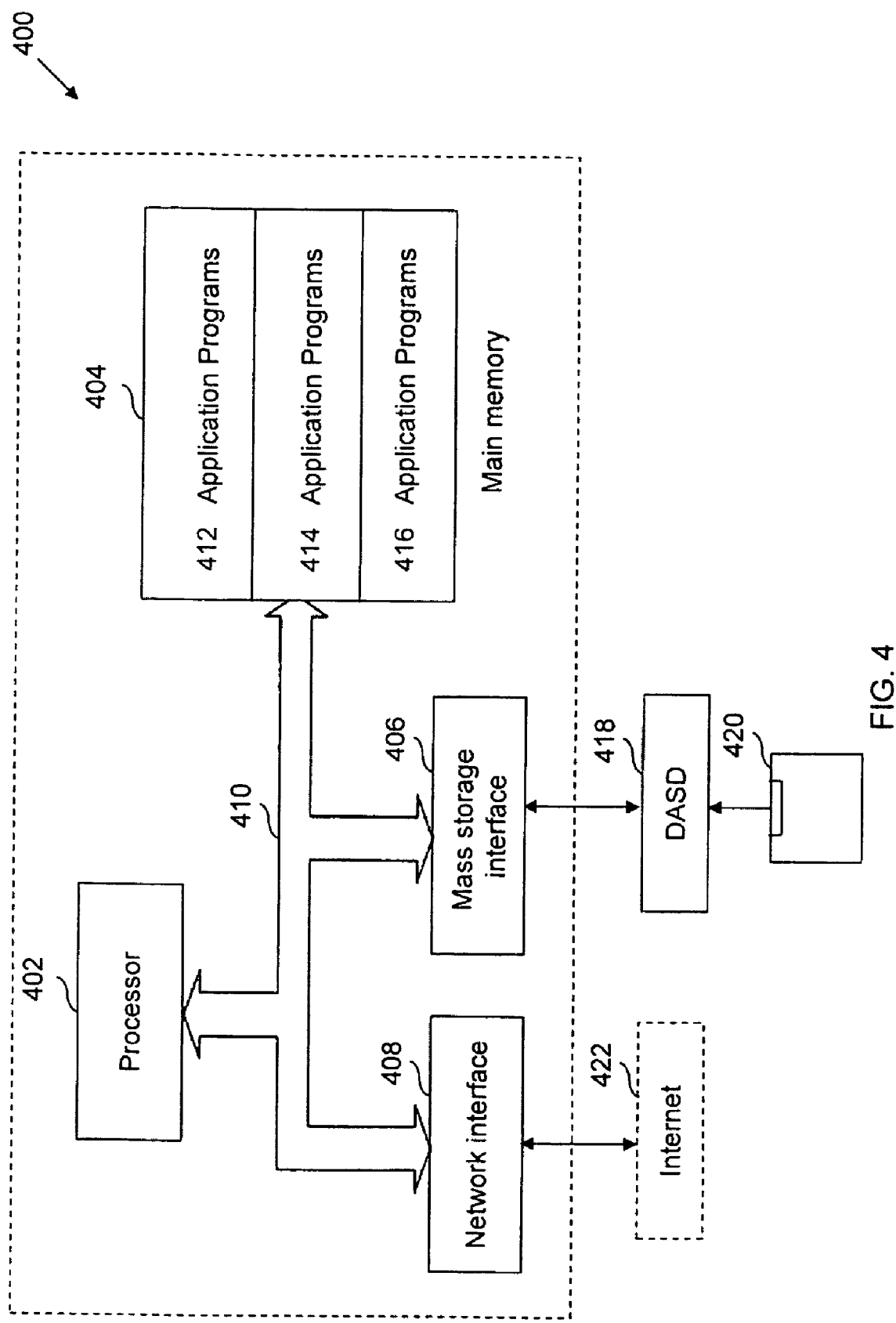
FIG. 4 is a block diagram of an apparatus for facilitating distribution of content between one or more clients in accordance with an embodiment of the present invention.

FIG. 4 is a block diagram of an apparatus for processing of the request in accordance with an embodiment of the present invention. Apparatus depicted in the FIG. 4 is computer system 400 that includes processor 402, main memory 404, mass storage interface 406, and network interface 408, all connected by system bus 410. Those skilled in the art will appreciate that this system encompasses all types of computer systems: personal computers, midrange computers, mainframes, etc. Note that many additions, modifications, and deletions can be made to this computer system 400 within the scope of the invention. Examples of possible additions include: a display, a keyboard, a cache memory, and peripheral devices such as printers.

FIG. 4 further depicts processor 402 that can be constructed from one or more microprocessors and/or integrated circuits. Processor 402 executes program instructions stored in main memory 404. Main memory 404 stores programs and data that computer system 400 may access.

In an embodiment of the present invention, main memory 404 stores program instructions that perform one or more process steps as explained in conjunction with the FIGS. 2 and 3. Further, a programmable hardware executes these program instructions. The programmable hardware may include, without limitation hardware that executes software based program instructions such as processor 402. The programmable hardware may also include hardware where program instructions are embodied in the hardware itself such as Field Programmable Gate Array (FPGA), Application Specific Integrated Circuit (ASIC) or any combination thereof.

FIG. 4 further depicts main memory 404 that includes one or more application programs 412, data 414, and operating system 416. When computer system 400 starts, processor 402 initially executes the program instructions that make up operating system 416. Operating system 416 is a sophisticated program that manages the resources of computer system 400 for example, processor 402, main memory 404, mass storage interface 406, network interface 408, and system bus 410.

In an embodiment of the present invention, processor 402 under the control of operating system 416 executes application programs 412. Application programs 412 can be run with program data 414 as input. Application programs 412 can also output their results as program data 414 in main memory 404.

FIG. 4 further depicts mass storage interface 406 that allows computer system 400 to retrieve and store data from auxiliary storage devices such as magnetic disks (hard disks, diskettes) and optical disks (CD-ROM). These mass storage devices are commonly known as Direct Access Storage Devices (DASD) 418, and act as a permanent store of information. One suitable type of DASD 418 is floppy disk drive that reads data from and writes data to floppy diskette 420. The information from the DASD can be in many forms. Common forms are application programs and program data. Data retrieved through mass storage interface 406 is usually placed in main memory 404 where processor 402 can process it.

While main memory 404 and DASD 418 are typically separate storage devices, computer system 400 uses well known virtual addressing mechanisms that allow the programs of computer system 400 to run smoothly as if having access to a large, single storage entity, instead of access to multiple, smaller storage entities (e.g., main memory 404 and DASD 418). Therefore, while certain elements are shown to reside in main memory 404, those skilled in the art will recognize that these are not necessarily all completely contained in main memory 404 at the same time. It should be noted that the term "memory" is used herein to generically refer to the entire virtual memory of computer system 400. In addition, an apparatus in accordance with the present invention includes any possible configuration of hardware and software that contains the elements of the invention, whether the apparatus is a single computer system or is comprised of multiple computer systems operating in concert.

FIG. 4 further depicts network interface 408 that allows computer system 400 to send and receive data to and from any network connected to computer system 400. This network may be a local area network (LAN), a wide area network (WAN), or more specifically Internet 422. Suitable methods of connecting to a network include known analog and/or digital techniques, as well as networking mechanisms that are developed in the future. Many different network protocols can be used to implement a network. These protocols are specialized computer programs that allow computers to communicate across a network. TCP/IP (Transmission Control Protocol/Internet Protocol), used to communicate across the Internet, is an example of a suitable network protocol.

FIG. 4 further depicts system bus 410 that allows data to be transferred among the various components of computer system 400. Although computer system 400 is shown to contain only a single main processor and a single system bus, those skilled in the art will appreciate that the present invention may be practiced using a computer system that has multiple processors and/or multiple buses. In addition, the interfaces that are used in the preferred embodiment of the present invention may include separate, fully programmed microprocessors that are used to off-load compute-intensive processing from processor 402, or may include I/O adapters to perform similar functions.

With the advent of Web 2.0 technologies, web pages with the asynchronous content are becoming increasingly fragmented, resulting in increase in number of cached fragments and decrease in the likelihood that any of those cached fragments being requested again by multiple clients. With the invention explained above, multiple clients instead of the result server may cache the asynchronous content. This releases the storage space of the result server and also releases the burden of the clients from constantly polling the result server for the same asynchronous content.

Later, when clients requests for the asynchronous content, the result server may act as a proxy between the clients who have the asynchronous content stored in their cache, and a new client who subscribes with the result server for the asynchronous content. Also, there is no requirement for any additional software on the clients beyond typical client/server communication software, such as a web browser, since the result server is acting as a proxy between the clients.

The present invention may take the form of an entirely hardware embodiment, an entirely software embodiment or an embodiment containing both hardware and software elements. In accordance with an embodiment of the present invention, the invention is implemented in software, which includes, but is not limited to firmware, resident software, microcode, etc.

Furthermore, the invention may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus or device.

The afore-mentioned medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CDROM), compact disk-read/write (CD-R/W), DVD and blu-ray.

In the aforesaid description, specific embodiments of the present invention have been described by way of examples with reference to the accompanying figures and drawings. One of ordinary skill in the art will appreciate that various modifications and changes can be made to the embodiments without departing from the scope of the present invention as set forth in the claims below. Accordingly, the specification and figures are to be regarded in an illustrative rather than a restrictive sense, and all such modifications are intended to be included within the scope of present invention.

What is claimed is:

1. A computer implemented process to facilitate distribution of asynchronous content by a result server comprising:
   using a computer, performing the following series of steps:
      subscribing at least one client in response to a subscription request from the at least one client, wherein the subscription request is for the asynchronous content;
      publishing the asynchronous content when it becomes available, wherein the publishing leads to dissemination of the asynchronous content from the result server to the subscribed clients, and removal of the asynchronous content from the result server;
      receiving subscription request for the asynchronous content from additional client(s), wherein the additional client(s) is not one of the subscribed clients;
      polling the subscribed clients for the asynchronous content; and
      sending the asynchronous content to the additional client(s) upon receipt of the asynchronous content from any of the subscribed clients.

2. The computer implemented process of claim 1, wherein publishing the asynchronous content comprises notifying the subscribed clients for the availability of the asynchronous content.

3. The computer implemented process of claim 1, wherein dissemination of the asynchronous content comprises caching the asynchronous content at the subscribed clients.

4. The computer implemented process of claim 1 further comprising caching the asynchronous content at the result server if number of subscription requests for the asynchronous content is greater than a predetermined threshold.

5. The computer implemented process of claim 4 further comprising sending the asynchronous content to the additional client(s) if the asynchronous content is cached on the result server.

6. A computer implemented process to facilitate distribution of asynchronous content by a result server comprising:
   using a computer, performing the following series of steps:
      subscribing at least one client in response to subscription requests for the asynchronous content received at the result server from the at least one client;
      publishing the asynchronous content when it becomes available, wherein the publishing leads to dissemination of the asynchronous content from the result server to the subscribed clients, and removal of the asynchronous content from the result server;
      receiving subscription request for the asynchronous content from additional client(s), wherein the additional client(s) is not one of the subscribed clients;
      checking by the result server if the asynchronous content is cached on the result server upon receiving the subscription request from the additional client(s);
      sending the asynchronous content to the additional client(s) if the asynchronous content is cached on the result server; and
      if the asynchronous content is not cached on the result server, performing:
         polling the subscribed clients by the result server for the asynchronous content;
         sending the asynchronous content by the result server to the additional client(s) upon receipt of the asynchronous content from any client belonging to the subscribed client(s); and caching the asynchronous content on the result server if number of subscription requests for the asynchronous content equals the predetermined threshold.

7. A programmable apparatus for facilitating distribution of asynchronous content by a result server, comprising:
a programmable hardware connected to a memory;
a program stored in the memory;
wherein the program directs the programmable hardware to perform the following series of steps:
subscribing at least one client in response to a subscription request from the at least one client, wherein the subscription request is for the asynchronous content;
publishing the asynchronous content when it becomes available, wherein the publishing leads to dissemination of the asynchronous content from the result server to the subscribed clients, and removal of the asynchronous content from the result server;
receiving subscription request for the asynchronous content from additional client(s), wherein the additional client(s) is not one of the subscribed clients;
polling the subscribed clients for the asynchronous content; and
sending the asynchronous content to the additional client(s) upon receipt of the asynchronous content from any of the subscribed clients.

8. A computer program product for causing a computer to facilitate distribution of asynchronous content by a result server, comprising:
a computer readable storage medium;
a program stored in the computer readable storage medium;
wherein the computer readable storage medium, so configured by the program, causes a computer to perform the following series of steps:
subscribing at least one client in response to a subscription request from the at least one client, wherein the subscription request is for the asynchronous content;
publishing the asynchronous content when it becomes available, wherein the publishing leads to dissemination of the asynchronous content from the result server to the subscribed clients, and removal of the asynchronous content from the result server;
receiving subscription request for the asynchronous content from additional client(s), wherein the additional client(s) is not one of the subscribed clients;
polling the subscribed clients for the asynchronous content; and
sending the asynchronous content to the additional client(s) upon receipt of the asynchronous content from any of the subscribed clients.

9. The computer program product of claim 8, wherein publishing the asynchronous content comprises notifying the subscribed clients for the availability of the asynchronous content.

10. The computer program product of claim 8, wherein dissemination of the asynchronous content comprises caching the asynchronous content at the subscribed clients.

11. The computer program product of claim 8 further causes a computer to perform caching of the asynchronous content by the result server if number of subscription requests for the asynchronous content is greater than a predetermined threshold.

12. The computer program product of claim 11 further causes a computer to perform sending the asynchronous content to the additional client(s) if the asynchronous content is cached on the result server.

* * * * *